United States Patent [19]

Ollivier

[11] Patent Number: 5,248,857
[45] Date of Patent: Sep. 28, 1993

[54] APPARATUS FOR THE ACQUISITION OF A SEISMIC SIGNAL TRANSMITTED BY A ROTATING DRILL BIT

[75] Inventor: Yves R. M. Ollivier, Lardy, France

[73] Assignee: Compagnie Generale de Geophysique, France

[21] Appl. No.: 14,086

[22] Filed: Feb. 4, 1993

Related U.S. Application Data

[63] Continuation of Ser. No. 690,119, Apr. 23, 1991, abandoned.

[30] Foreign Application Priority Data

Apr. 27, 1990 [FR] France .................. 90 05387

[51] Int. Cl.⁵ ............................................. G01V 1/40
[52] U.S. Cl. ...................................... 181/102; 181/108;
340/854.4; 367/25; 367/82; 367/912; 73/151;
175/40
[58] Field of Search ........................... 340/854.4, 856.4;
367/82, 25, 912; 73/151, 152; 181/102, 108;
175/40, 50

[56] References Cited

U.S. PATENT DOCUMENTS

| | | | |
|---|---|---|---|
| 2,414,719 | 1/1947 | Cloud | 178/44 |
| 3,486,375 | 12/1969 | Redwine et al. | 73/152 |
| 4,715,451 | 12/1987 | Bseisu et al. | 175/40 |
| 4,965,774 | 10/1990 | Ng et al. | 367/75 |
| 5,141,061 | 8/1992 | Henneuse | 175/56 |
| 5,166,908 | 11/1992 | Montgomery | 367/165 |
| 5,193,628 | 3/1993 | Hill et al. | 175/45 |

FOREIGN PATENT DOCUMENTS

0273722 6/1988 European Pat. Off. .
2617901 1/1989 France .
8801096 1/1988 PCT Int'l Appl. .

Primary Examiner—J. Woodrow Eldred
Attorney, Agent, or Firm—Blakely, Sokoloff, Taylor & Zafman

[57] ABSTRACT

The invention concerns an apparatus for the acquisition of a seismic signal transmitted by a drill bit, placed at the end of a drill pipe rotating about an axis of rotation. According to the invention, the acquisition apparatus consists of a coupling connector (110) intended to be fixed to the said drill pipe (10), an insulating rotor (120), designed to be fixed to the said connector, and fitted with parallel strip conductors (121,122) connected respectively to the outputs of at least one vibration transducer (111) integral with the connector/rotor combination, means (151) for fixing the rotor (120) to the connector (110) and means (152) for centering placed on the said coupling connector, designed to maintain the said strip conductors (121,122) centered on the axis of rotation (21), and a stator (160) forming a retaining ring on the said insulating rotor (120) and containing contacts (161,162) provided to cooperate respectively with the strip conductors of the rotor, and the relative motion of the stator (160) and the rotor is ensured by at least support bearings (163,164). Application to the geophysical survey or the subsoil.

10 Claims, 4 Drawing Sheets

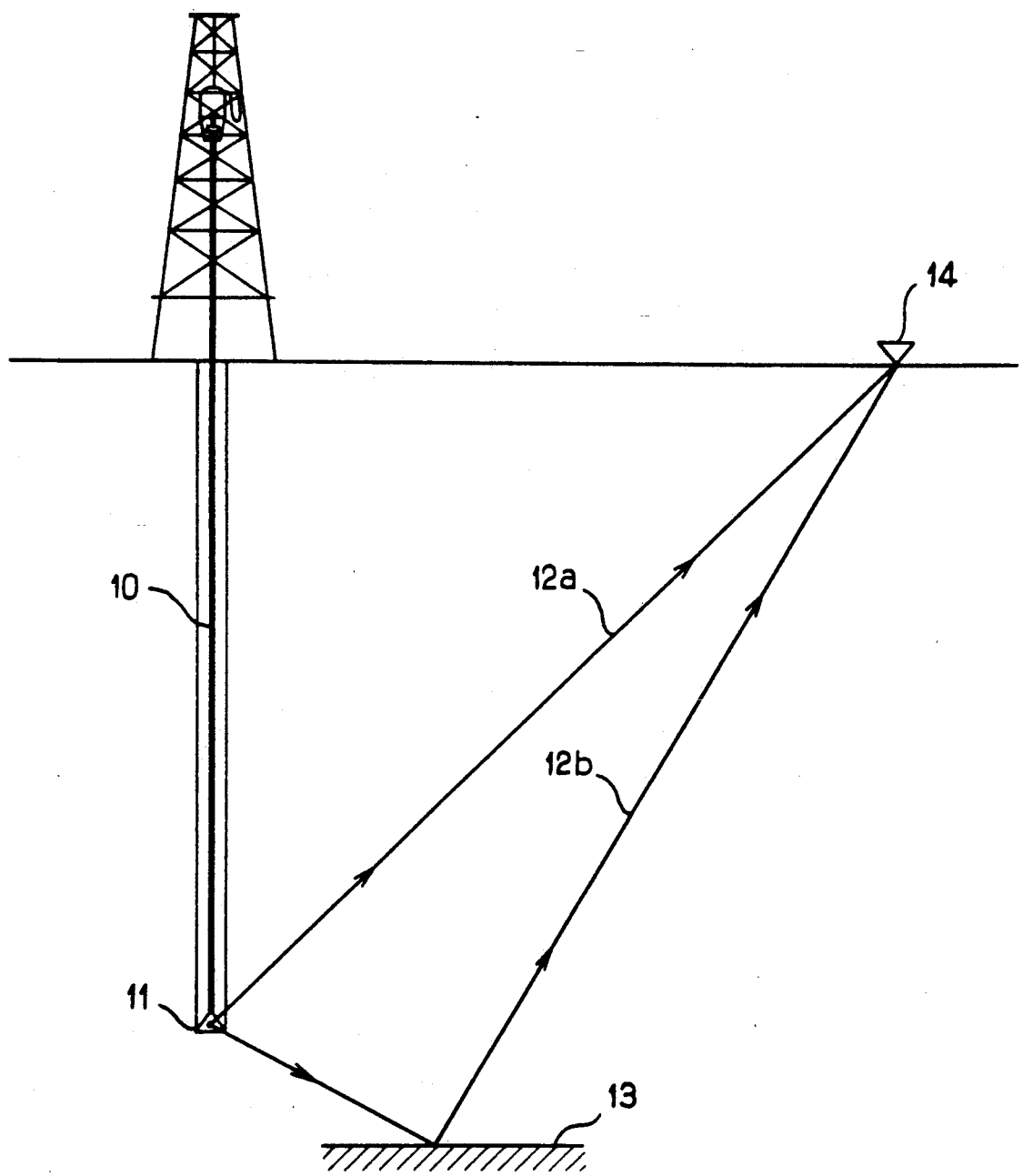
FIG_1

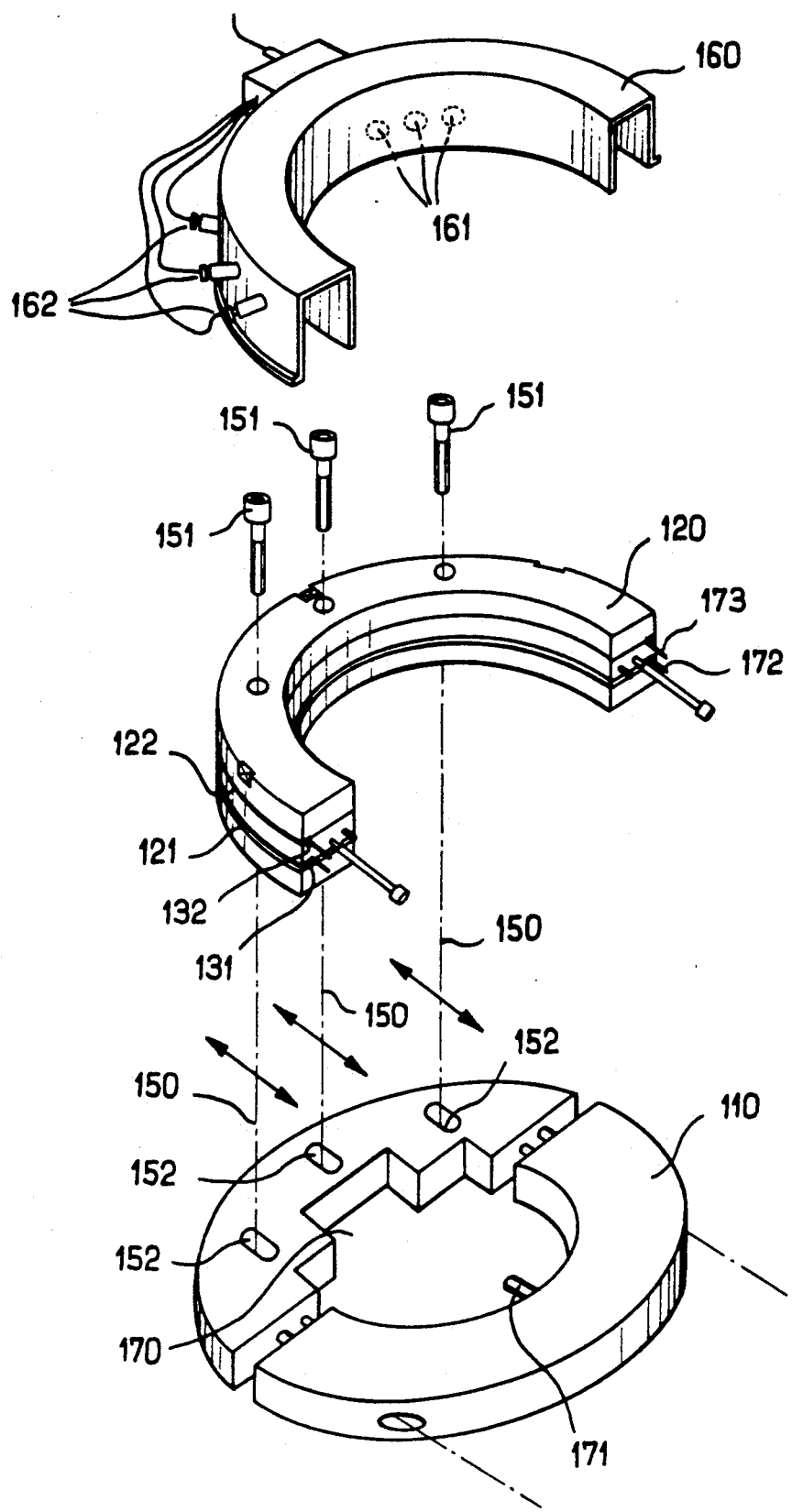
FIG_3

APPARATUS FOR THE ACQUISITION OF A SEISMIC SIGNAL TRANSMITTED BY A ROTATING DRILL BIT

This is a continuation of application Ser. No. 07/690,119 filed Apr. 23, 1991 now abandoned.

The present invention relates to an apparatus for the acquisition of a seismic signal transmitted by a drill bit, placed at the end of a drill pipe rotating about an axis of rotation.

The invention has an especially advantageous application in the area of the geophysical survey of the subsoil by seismic measurements from sources placed in boreholes, especially oil wells.

European Patent No. 0 273 722 describes a seismic acquisition apparatus conforming to the preamble, which exploits the fact that, in an oil drilling operation, the three-cone rock bit behaves as a random seismic source. The analysis of the signals received at the surface, by geophones, for example, accordingly helps to obtain data characteristic of the geological strata traversed by the wave transmitted by the bit, after the surface signals have been made mutually coherent by correlation with a pilot signal representative of the transmission signal. This signal is generally acquired by an accelerometer placed at the top of the drill string, whose metallic construction ensures good transmission of the signal sent by the drill bit. From the practical standpoint, however, it is difficult to access the drill string directly in so far as the drill pipes are actuated with a rotating motion. This is why the transducer is usually mounted on the fixed mud swivel. However, due in particular to the presence of a rotating seal joint between the pipe and the swivel, the transfer function at this level is not very satisfactory.

Thus the technical problem to be solved by the object of the present invention is to make an apparatus for the acquisition of a seismic signal transmitted by a drill bit, placed at one end of a drill pipe rotating about an axis of rotation, an apparatus which would offer a better coupling with the rotating pipe than the apparatus known in the state of the technique.

According to the invention, the solution to the technical problem posed is obtained in the sense that the apparatus consists of a coupling connector intended to be fixed to the said drill pipe, an insulating rotor, designed to be fixed to the said connector, and fitted with parallel strip conductors connected respectively to the outputs of at least one vibration transducer integral with the connector/rotor combination, means for fixing the rotor to the connector and means for centering placed on the said coupling connector, designed to maintain the said strip conductors centered on the axis of rotation, and a stator forming a retaining ring on the said insulating rotor and containing contacts provided to cooperate respectively with the strip conductors of the rotor, and the relative motion of the stator and the rotor is ensured by at least support bearings.

Thus, by being ensured exclusively by rigid metallic attachments, the coupling between the vibration transducer and the drill pipe can be considered as direct, independent of the rotating motion of the pipe, because the transducer is fixed with respect to the pipe. This results in excellent transmission to the pick-up of the signal transmitted by the drill bit.

In a first embodiment of the invention, the vibration transducer is placed in the coupling connector, offering the possibility of obtaining a very short connection between the vibration transducer and the rotating pipe.

In a second embodiment of the apparatus according to the invention, the vibration transducer is placed in the rotor with the advantage of simplified electrical connections between the transducer and the strip conductors.

In general, geophysical measurements taken by means of an apparatus conforming to the preamble are performed at the same time as the actual drilling operations by seizing the opportunity offered by the presence, on the site, of installations which are then placed by the driller at the disposal of the geological exploration team. Thus, to avoid excessive interference between the two types of activity, it is intended that the coupling connector, the rotor and the stator be made of two removable parts, about a secant plane, for example. In this way, the apparatus, object of the invention, can be easily mounted on the drill pipe without having to modify it or to dismantle it. Furthermore, and still with the same concern of easy adaptation to any shape of drill pipe, the coupling connector is also provided with means to ensure the parallelism and concentricity of the connector with the axis of rotation of the rotating drill pipe, and a means of adjusting the centering of the connector with respect to the said axis of rotation.

The following description, with respect to the appended drawings given as examples not restrictive of scope, will clarify what the invention consists of and how it can be made.

FIG. 1 is a general schematic view of a drilling rig.

FIG. 2a is a cross-section of the drill pipe of FIG. 1, showing an installation of an apparatus according to the invention.

FIG. 2b is a detailed cross-sectional view of the apparatus according to the invention shown in FIG. 2a.

FIG. 3 is an exploded perspective view of the different components of the apparatus according to the invention.

Figures 2A, 2B:
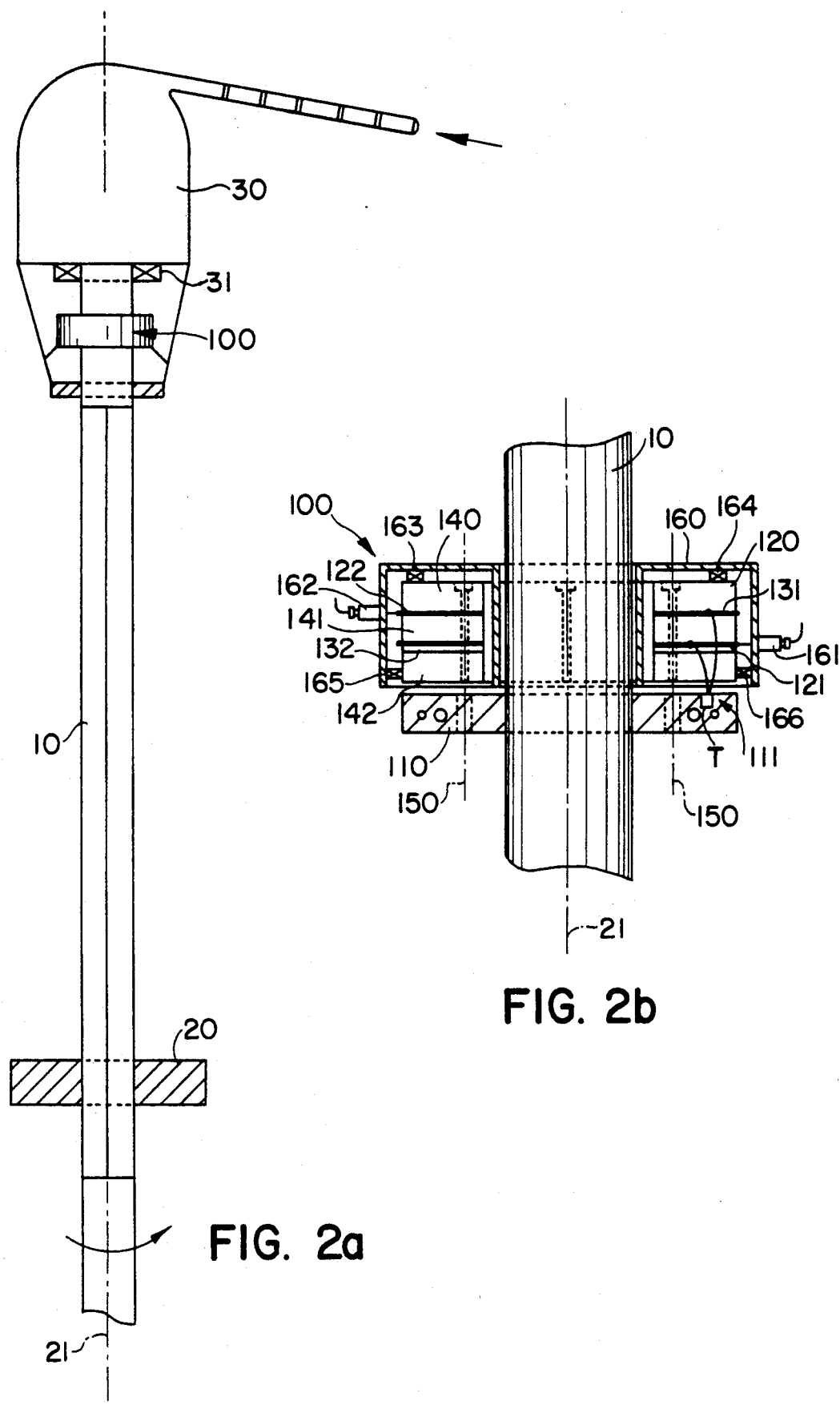

FIG. 1 shows, very schematically, a drilling rig essentially comprising a drill pipe 10, or a drill string, fitted at one of its ends with a three-cone rock bit 11. When it breaks the rock, this bit 11 generates a random seismic signal which can either be transmitted directly to the surface along path 12a, or reach the surface along path 12b, that is to say after having been reflected on a zone 13 of the subsoil exhibiting an acoustic impedance contrast. The detection by a geophone 14 of the signals 12a and 12b serves to obtain data concerning, for example, zone 13 with acoustic contrast. However, this operation is only feasible if the signals reaching the geophone 14 are made coherent by correlation with the transmission signal, often called the 'pilot' signal, which transits along the drill pipe 10 and can hence be acquired at the other end of the pipe.

The upper part of the drilling rig in FIG. 1 is shown in a cross-section in FIGS. 2a and 2b. As these figures show, the drill pipe 10 is set in rotation about an axis 21 by means of a motor not shown, and a square-section drive system 20 placed at a position of the pipe where the pipe has a square section of the same size. The upper end of the pipe 10 comprises a mud swivel 30 made immobile in space by a swivel 31. The known devices used to record the transmission signal produced by a drill bit 11 in FIG. 1 are fitted with a vibration transducer T generally placed on a mud swivel 30 of the type shown in FIG. 2a. However, the coupling between the pipe 10 of the type shown in FIGS. 1 and 2a, and the transducer T thus placed proves to be insufficient for good reception of the pilot signal.

Figure 2C:
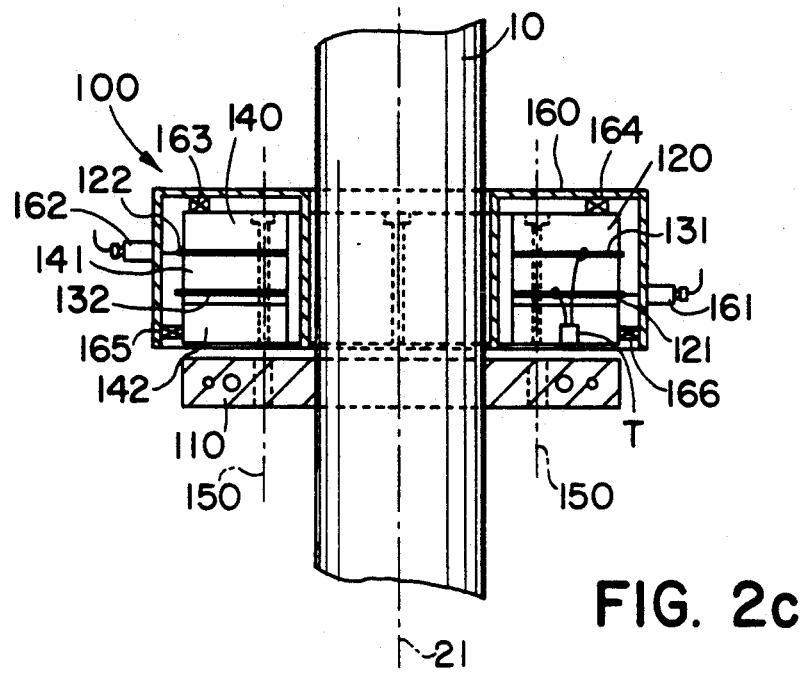
FIG. 2c is a detailed cross-sectional view of another embodiment of the apparatus according to the invention.
Figure 4:
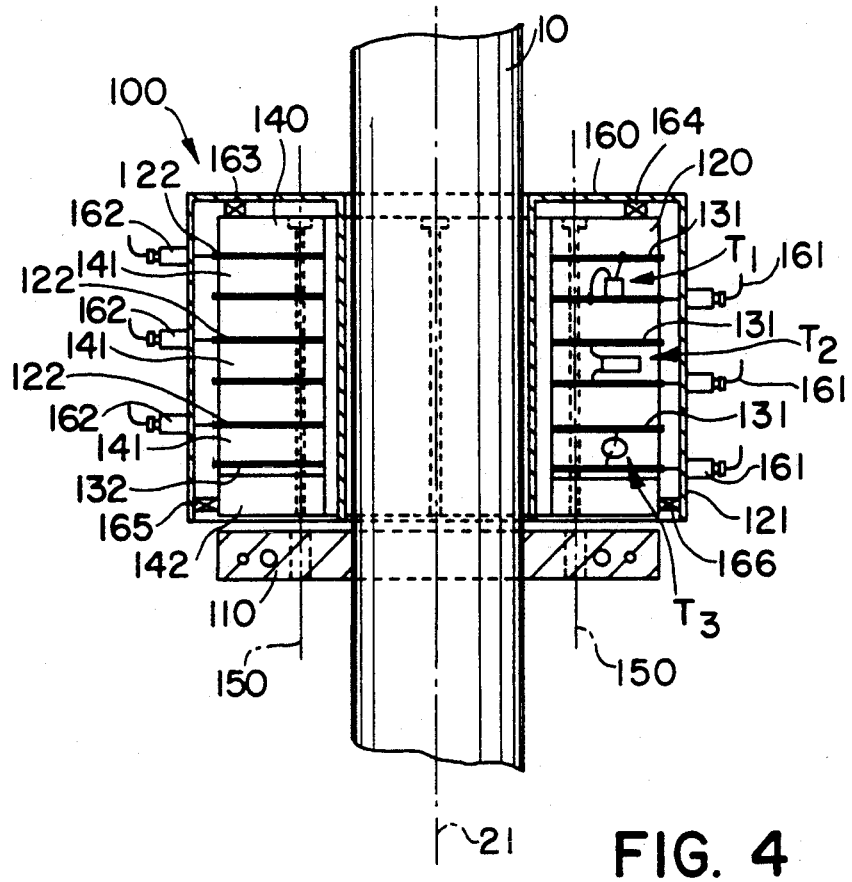

FIGS. 2a and 2b show an apparatus 100 for the acquisition of the seismic signal transmitted by the three-cone rock bit, which has the advantageous feature of being directly integral with the drill pipe 10. To achieve this purpose, the apparatus 100 shown in FIGS. 2a and 2b, and in FIG. 3 in an exploded perspective view, comprises a coupling connector 110 of approximately annular form designed to be fixed to the said pipe 10. Furthermore, an insulating rotor 120 is itself fixed to the said connector 110 and fitted with two parallel strip conductors 121 and 122, connected respectively to two outputs of a vibration transducer, T. In the illustrated embodiment in FIGS. 2a and 2b said vibration transducer T is placed in the housing 111 provided in the coupling connector 110. The conductors 121 and 122 are made up of flush mountings, on the outer side wall of the rotor, also of annular form, of two conducting layers 131 and 132 placed between layers 140, 141 and 142 of insulating material. The rotor is fixed to the connector to form a connector/rotor combination by means of screws 151 having axis 150 for example. It must be pointed out that the vibration transducer could also be placed in the rotor 120, as shown in FIG. 2c because the essential for the invention is that it be integral with the connector 110/rotor 120 combination. An annular stator 160 also forms a retaining ring on the said insulating rotor 120, and has at least one pair of contacts 161, 162, for example brush wipers, provided to cooperate respectively with the strip conductors 121, 122 of the rotor 120. The relative motion of the stator 160 and the rotor 120 is ensured in particular by support bearings 163, 164, while the centering of the stator 160 with respect to the rotor 120 is achieved by lateral guide bearings 165, 166.

FIG. 3 also shows that the coupling connector 110 has means of centering, consisting of oblong slots 152, serving to keep the said strip conductors 121, 122 centered on the axis of rotation. The said oblong slots 152 cooperate with the screws 151 of axes 150 of the rotor 120. After centering of the strip conductors, the rotor 120 is definitively fixed in position by the tightening of nuts, not shown in FIG. 3.

FIG. 3 also shows that the coupling connector 110 comprises, on the one hand, a profile section 170 with multiple recesses, of the stepped type, to ensure the parallelism and concentricity of the connector with the axis of rotation of the rotating pipe, and, on the other hand, a means of adjustment, consisting of a screw 171, designed to placed and to keep the profile 170 bearing against the pipe 10 irrespective of the diameter of the said pipe. The overall means formed by the profile 170 and the adjustment screw 171 thus serves to obtain a very broad universality in connection with assembly and adjustment to tool joints, of which the diameter may vary from 6 to 8 inches.

According to the especially advantageous embodiment illustrated in FIG. 3, the assembly connector 110, the rotor 120 and the stator 160 are made in two separable parts. FIG. 3 shows only one half of the rotor 120 and the stator 160. To guarantee electrical continuity between the two parts of each strip conductor 121, 122 of the rotor 120, male contacts 172, 173 are provided, placed at the ends of the conducting layers 131, 132, matching female contacts, not shown, also placed at the ends of the conducting layers of the other half of the rotor. The two halves of the connector, the rotor and the stator are held together mechanically by conventional assembly means, such as screws, knuckle joints etc.

The apparatus described, especially as shown in FIG. 2b, may also comprise a single vertical vibration transducer T in addition to a transducer, of the accelerometer type. It is clearly understood that, without going beyond the scope of the invention, it could also have a triaxial transducer array, consisting of three transducers positioned along three orthogonal directions.

I claim:

1. An apparatus (100) for the acquisition of a seismic signal transmitted by a drill bit (11), placed at one end of a drill pipe (10) rotating about an axis of rotation (21), the apparatus comprising a coupling connector (110) fixed to the drill pipe (10), an insulating rotor (120) having parallel strip conductors (121, 122), the insulating rotor (120) being fixed to the connector so as to form a combination of elements consisting of the connector and the rotor, the parallel strip conductors (121, 122) connected respectively to outputs of at least one vibration transducer (T) placed in one element of the combination, the apparatus further comprising means (151) for fixing the rotor (120) to the connector (110) and means (152) for centering placed on the coupling connector to maintain the strip conductors (121, 122) centered on the axis of rotation (21), a stator (160) forming a retaining ring on the insulating rotor (120) and having contacts (161, 162) provided to cooperate respectively with the strip conductors (121, 122) of the rotor (120), and support bearings (163, 164) disposed between the stator (160) and the rotor (120) to maintain relative motion between the stator (160) and the rotor (120).

2. Apparatus as claimed in claim 1, in a housing provided in which said vibration transducer (T) is placed in said coupling connector (110).

3. Apparatus as claimed in claim 1, in which said vibration transducer is placed in said rotor.

4. Apparatus as claimed in claim 1, in which said coupling connector (110), rotor (120) and stator (160) have an approximately annular form.

5. Apparatus as claimed in claim 1, in which said coupling connector (110), rotor (120) and stator (160) are made of two separable parts.

6. Apparatus as claimed in claim 5, in which each said strip conductor (121,122) is divided into two parts interconnected by a means (172,173) of electrical continuity.

7. Apparatus as claimed in claim 1, in which said coupling connector (110) also comprises means (170) to ensure the parallelism and concentricity of said connector (110) with said axis of rotation (21) of said rotating drill pipe (10), and a means (171) of adjusting the centering of said connector (110) with respect to said axis of rotation (21).

8. Apparatus as claimed in claim 1, in which said rotor (120) also has bearings (165,166) for lateral guidance of said stator (160) on said rotor (120).

9. Apparatus as claimed in claim 2, in which said vibration transducer (T) is an accelerometer.

10. Apparatus as claimed in claim 2, in which said apparatus has a single vertical vibration transducer (T).

* * * * *